Patented May 14, 1940

2,200,414

UNITED STATES PATENT OFFICE 2,200,414

MANUFACTURE OF NEW AZO DYESTUFFS

Wilfrid Herbert Cliffe, Blackley, Manchester, England, assignor to Imperial Chemical Industries Limited, a corporation of Great Britain No Drawing. Application May 21, 1937, Serial No. 144,099. In Great Britain May 26, 1936

7 Claims. (Cl. 260—160)

This invention relates to the manufacture of new azo dyestuffs.

This invention has, as an object to produce new azo dyestuffs. A further object is to provide a new method of manufacturing azo dyes. A still further object is to provide a new method of dyeing. Further objects will appear hereinafter.

These objects are accomplished by the following invention. I have found that I can manufacture new azo dyestuffs by tetrazotising 1 molecular proportion of a diamine of the general formula

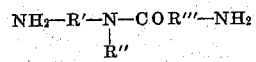

where both R′ and R‴ are phenylene or alkyl substituted phenylene and R″ is alkyl, and coupling with 2 molecular proportions of the same or two different coupling components.

An alternative method of manufacturing some of the new dyestuffs is by diazotising 1 molecular proportion of a nitroamine of the formula

where X is

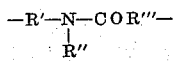

and R′, R″ and R‴ have the significance given above, coupling with 1 molecular proportion of a coupling component free from diazotisable amino groups, reducing the nitro group of the azo compound so-obtained, and again diazotising and coupling with 1 molecular proportion of the same or a different coupling component.

The following examples illustrate but do not limit the invention.

Example 1

33 parts of 3:4′-diamino-4-methylbenzoyl-N-ethyl-anilide are dissolved in 62.5 parts of 36% aqueous hydrochloric acid and 600 parts of water and tetrazotised at 5–10° C. with a solution of 17.2 parts of sodium nitrite in 125 parts of water. The resulting tetrazo solution is added gradually to an ice-cold solution of 63.6 parts of 1-(4′-sulphophenyl)-3-methyl-5-pyrazolone and 60 parts of anhydrous sodium carbonate in 500 parts of water. Coupling is rapid and the new dyestuff so formed is salted out, filtered off and dried. The new dyestuff is soluble in water and dyes wool from an acid or neutral bath in reddish-yellow shades of good light fastness and very good fastness to milling and washing.

It has the probable formula:

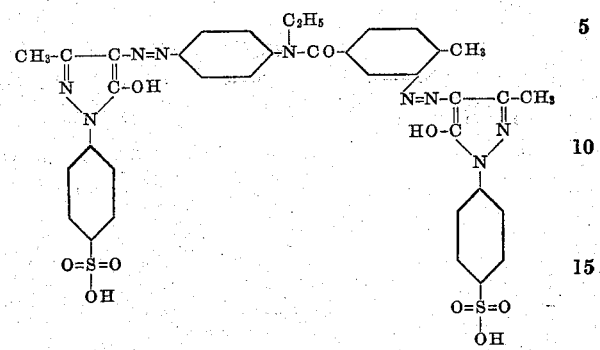

The 3:4′-diamino-4-methylbenzoyl-N-ethylanilide used in the above example is a new compound. It is conveniently prepared as follows:

48 parts of p-toluic-N-ethylanilide M. P. 69° C. obtained by reacting N-ethyl-N-phenylurea chloride with toluene in presence of anhydrous aluminum chloride (see Lellman and Benz, Berichte der deutschen chemischen Gesellschalt, 1891, 24, 2114), are added to 360 parts of concentrated sulphuric acid at 0–5° C. A mixture of 30 parts of 94.6% nitric caid and 90 parts of concentrated sulphuric acid is then gradually added. The reaction mixture is stirred at 0–5° C. throughout the addition. After stirring for a further 16 hours, during which time the reaction mixture has been allowed to rise to rom temperature, the total mixture is poured on to ice and the 3:4′-dinitro-4-methylbenzoyl-N-ethylanilide which is thus precipitated is filtered off and washed with water. By recrystallization from ethanol the ninitro compound is obtained in the form of pale crystals M. P. 144° C. By heating with dilute sulphuric caid the dinitro compound may be hydrolysed to give a mixture of 4-nitro-ethylaniline and 3-nitro-4-methyl-benzoic acid.

The dinitro compound is readily reduced to the required diamine by means of iron and hydrochloric or acetic acid in aqueous or ethanol medium. The resulting diamine when recrystallized from aqueous ethanol gives white crystals M. P. 158° C. It has the probable formula

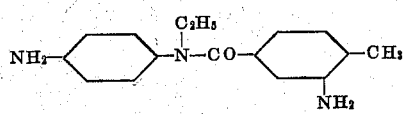

Example 2

33 parts of the 3:3'-diamino-4-methylbenzoyl-N-ethylanilide of Example 1 are tetrazotised as therein described. The resulting tetrazo solution is neutralized to Congo red paper by addition of aqueous sodium hydroxide at 0°–5° C. To the neutralized tetrazo solution is added a solution of 17.2 parts of salicylic acid in 5.0 parts of sodium hydroxide and 350 parts of water, followed by addition of 30 parts of anhydrous sodium carbonate dissolved in 150 parts of water. The coupling mixture is stirred at 0–5° C. until the formation of the monoazo compound is complete. A further 30 parts of anhydrous sodium carbonate dissolved in 150 parts of water are then added, followed by a solution of 42 parts of the sodium salt of 2-phenylamino-8-naphthol-6-sulphonic acid. The coupling mixture is stirred until coupling is complete and the new disazo dyestuff is salted out, filtered off and dried. The new dyestuff is soluble in water and dyes wool from a neutral or acid bath in brown shades which have very good fastness to washing and milling. It has the probable formula:

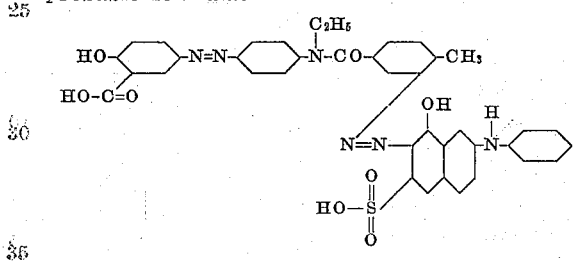

Example 3

33 paras of 3:4'-diamino-4-methylbenzoyl-N-ethyl-anilide are tetrazotised as described in Example 1 and the tetrazo solution so obtained is added gradually to an ice-cold solution of 87 parts of the disodium salt of 2-naphthol-6:8-disulphonic acid and 50 parts of anhydrous sodium carbonate in 600 parts of water. Coupling is rapid and the dyestuff so formed is salted out, filtered off and dried. It is soluble in water and dyes wool from an acid or neutral bath in orange shades of good fastness to washing and milling and of very good fastness to light. It has the probable formula:

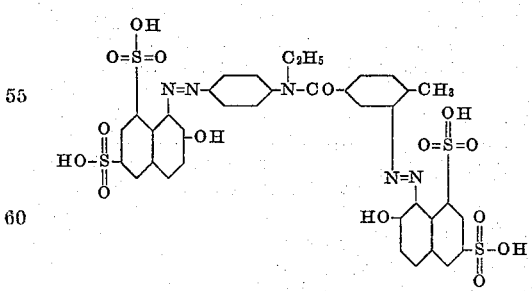

Example 4

33 parts of 3:4'-diamino-4-methylbenzoyl-N-ethyl-anilide are tetrazotised as described in Example 1 and the tetrazo solution so obtained is added to an ice-cold solution of 77 parts of the sodium salt of 2-N-β-hydroxyethylamino-8-naphthol-6-sulphonic acid and 50 parts of anhydrous sodium carbonate in 600 parts of water. Coupling is rapid and a portion of the new dyestuff so formed separates out of the solution. Salt is added to precipitate the remainder and the dyestuff is filtered off and dried. It is soluble in water and dyes wool from an acid bath brown shades of very good fastness to washing and milling and to light. It has the probable formula:

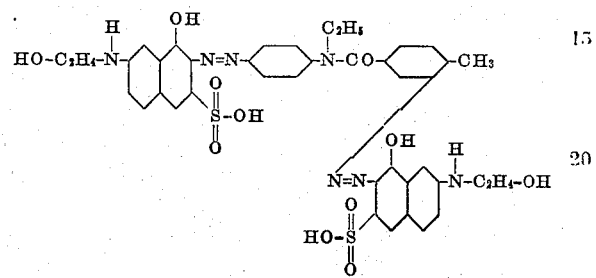

Example 5

49.3 parts of 4:4'-diaminobenzoyl-N-dodecylanilide are dissolved in 62.5 parts of 36% aqueous hydrochloric acid and 500 parts of water and tetrazotised as 5°–10° C. with a solution of 17.2 parts of sodium nitrite in 125 parts of water. The resulting tetrazo solution is added gradually to an ice-cold solution of 66 parts of the sodium salt of 2:8-aminonaphthol-6-sulphonic acid and 50 parts of anhydrous sodium carbonate in 600 parts of water. Coupling is rapid and a portion of the new dyestuff so-formed separates out of solution. Salt is added to precipitate the remainder and the dyestuff is filtered off and dried. It dyes wool from a neutral or acid bath bright shades of red-brown and of very good fastness to washing and milling and to light. It has the probable formula:

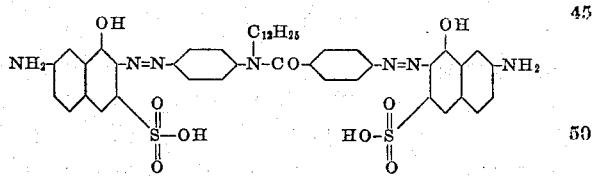

Example 6

49.3 parts of 4:4'-diaminobenzoyl-N-dodecylanilide are tetrazotised as in Example 5 and the tetrazo solution so obtained is added gradually to an ice-cold solution of 77 parts of the sodium salt of 2-N-β-hydroxyethylamino-8-naphthol-6-sulphonic acid and 50 parts of anhydrous sodium carbonate in 600 parts of water. Coupling is rapid and the new dyestuff so formed separates out of solution and is filtered off and dried. It dyes wool from a neutral or acid bath brown shades of very good fastness to washing and milling and of good fastness to light. It has the probable formula:

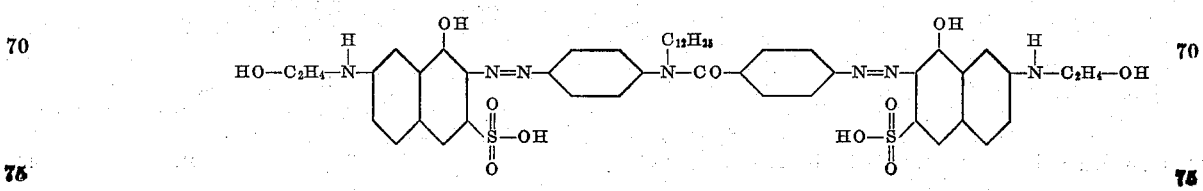

Further examples of dyestuffs obtained according to the invention are given in the following table.

| Diazo component | Coupling components | Shade on wool |
|---|---|---|
| 3:4'-diamino-4-methylbenzoyl-N-ethylanilide | 2 mols. of 1-(2':5'-dichloro-4'-sulphophenyl)-3-methyl-5-pyrazolone | Yellow. |
| Do | 2 mols. of 1-naphthol-4-sulphonic acid | Scarlet. |
| Do | 2 mols. of 1-naphthyl-amine-4-sulphonic acid | Orange. |
| Do | 2 mols. of 2-naphthol-6-sulphonic acid | Reddish orange. |
| Do | 2 mols. of 2-phenylamino-8-naphthol-6-sulphonic acid | Red-brown. |
| Do | 1 mol. of salicylic acid / 1 mol. of 1-phenyl-amino-naphthalene-2-sulphonic acid | }Yellowish-red. |
| Do | 1 mol. of salicylic acid / 1 mol. of 2-naphthol-6-sulphonic acid | }Orange. |
| Do | 1 mol. of salicylic acid / 1 mol. of monoazo compound (p-nitroaniline —(acid)→ 1:8-aminonaphthol-3:6-disulphonic acid). | }Green. |
| Do | 2 mols. of 2-naphthol-8-sulphonic acid | Orange. |
| Do | 2 mols. of 2-acetylamino-8-naphthol-6-sulphonic acid | Bright red. |
| Do | 2 mols. of 2-naphthol-3:6-disulphonic acid | Yellowish red. |
| Do | 2 mols. of 2:8-aminonaphthol-6-sulphonic acid | Red-brown. |
| Do | 2 mols. of 1-acetylamino-8-naphthol-3:6-disulphonic acid | Bluish-red. |
| Do | 1 mol. of salicylic acid / 1 mol. of 2-naphthol-6:8-disulphonic acid | }Yellowish orange. |
| Do | 1 mol. of 1-naphthol-4-sulphonic acid / 1 mol. of 2-naphthol-3:6-disulphonic acid | }Scarlet. |
| Do | 2 mols. of monoazo compound p-Nitraniline —acid→ 1:8-aminonaphthol-3:6-disulphonic acid | }Reddish navy blue |
| 4:4'-diaminobenzoyl-N-dodecylanilide | 2 mols. of 1-(4'-sulphophenyl)-3-methyl-5-pyrazolone | Yellow. |
| Do | 2 mols. of 2-naphthol-6-sulphonic acid | Orange. |
| Do | 2 mols. of 2-naphthol-6:8-disulphonic acid | Do. |
| Do | 2 mols. of 2-naphthol-8-sulphonic acid | Do. |
| Do | 2 mols. of 2-acetylamino-5-naphthol-7-sulphonic acid | Reddish-orange. |
| Do | 2 mols. of 2-acetylamino-8-naphthol-6-sulphonic acid | Red. |
| Do | 2 mols. of 1-naphthol-4-sulphonic acid | Scarlet. |
| Do | 2 mols. of 1-naphthol-3:6-disulphonic acid | Do. |
| Do | 2 mols. of 1-acetylamino-8-naphthol-3:6-disulphonic acid | Bluish-red. |
| Do | 2 mols. of 2:8-aminonaphthol-6-sulphonic acid | Red-brown. |
| Do | 1 mol. of 2-phenylamino-8-naphthol-6-sulphonic acid / 1 mol. of 2:8-aminonaphthol-3:6-disulphonic acid | }Brown. |
| Do | 1 mol. of salicylic acid / 1 mol. of p-nitraniline —acid→ 1:8-aminonaphthol-3:6-disulphonic acid | }Bluish-green. |
| 3:4'-diaminobenzoyl-N-cetylanilide | 2 mols. of 1-(2':5'-dichloro-4'-sulphophenyl)-3-methyl-5-pyrazolone | Yellow. |
| Do | 2 mols. of 2-naphthol-8-sulphonic acid | Orange. |
| Do | 2 mols. of 2-naphthol-6:8-disulphonic acid | Do. |
| Do | 2 mols. of 1-naphthol-4-sulphonic acid | Scarlet. |
| Do | 2 mols. of 1-(4'-sulphophenyl)-3-methyl-5-pyrazolone | Yellow. |
| 4:4'-diaminobenzoyl-N-cetylanilide | 2 mols. of 1-naphthol-4-sulphonic acid | Scarlet. |
| Do | 2 mols. of 2-N-β-hydroxyethyl-amino-8-naphthol-6-sulphonic acid | Yellowish-brown. |
| Do | 2 mols. of 1-(4'-sulphophenyl)-3-methyl-5-pyrazolone | Yellow. |
| 4:4'-diaminobenzoyl-N-octadecylanilide | 2 mols. of 2:8-aminonaphthol-6-sulphonic acid | Red-brown. |
| Do | 2 mols. of 2-naphthol-8-sulphonic acid | Orange. |

As coupling components I can use, for example, phenols, naphthols, naphtholsulphonic acids, naphthylamines, naphthylamine sulphonic acids, aminonaphthols, their sulphonic acids or N-substituted derivatives, arylpyrazolones, arylpyrazolone sulphonic or carboxylic acids or acetoaceticarylamides. Also I may use as coupling components monoazo compounds such as, for example, the compound obtained by coupling diazotised p-nitroaniline in mineral acid medium with 1:8-amino-naphthol-3:6-disulphonic acid.

Suitable diazo components may be obtained by nitrating, for example, a benzoyl- or methylbenzoyl-alkylanilide or a nitrobenzoylalkylanilide and subsequently reducing the dinitro compounds so-obtained either completely to give the required diamines or partially to give the required mononitroamines.

This invention is a valuable advance in the art as it gives new dyestuffs which dye wool from a neutral or acid bath to give dyeings with very good fastness to light, milling, and washing.

As many apparently widely different embodiments of this invention may be made without departing from the spirit and scope thereof, it is to be understood that I do not limit myself to the specific embodiments thereof except as defined in the appended claims.

I claim:

1. Process for the manufacture of new azo dyestuffs which comprises tetrazotising 1 molecular proportion of a compound of the formula

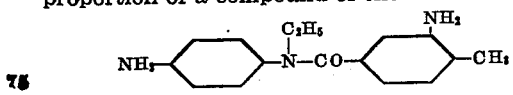

and coupling with two molecular proportions of the same or two different coupling components.

2. The compound represented by the formula:

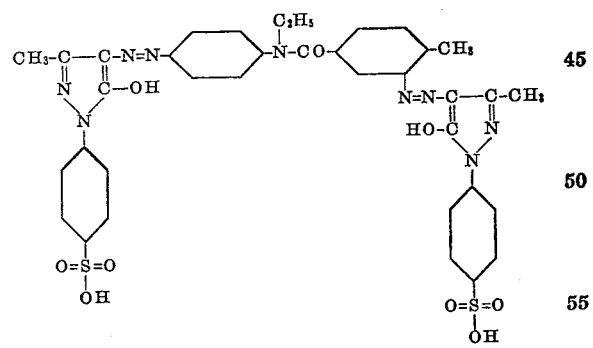

3. The compound represented by the formula:

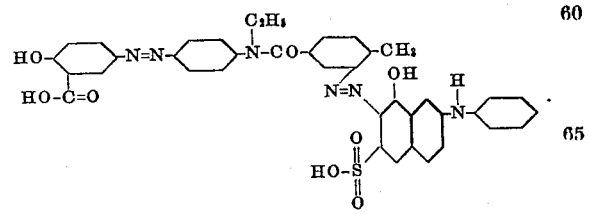

4. The compounds represented by the formula:

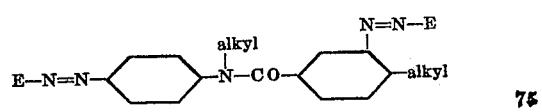

in which each E is the nucleus of an azo dyestuff coupling component.

5. The compounds represented by the formula:

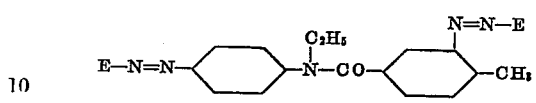

in which each E is the nucleus of an azo dyestuff coupling component.

6. The process which comprises tetrazotizing a compound represented by the formula:

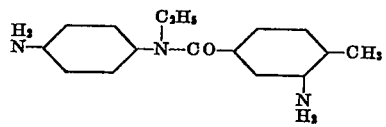

and reacting it with a compound represented by the formula:

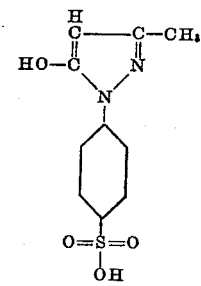

7. The process which comprises tetrazotizing the compound represented by the formula:

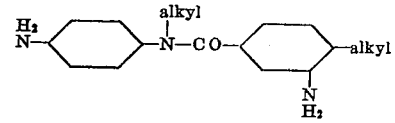

and reacting it with one or more azo dystuff coupling components.

WILFRID HERBERT CLIFFE.

CERTIFICATE OF CORRECTION.

Patent No. 2,200,414.  May 14, 1940.

WILFRED HERBERT CLIFFE.

It is hereby certified that error appears in the printed specification of the above numbered patent requiring correction as follows: Page 1, second column, lines 29 and 41, for "caid" read --acid--; line 34, for "rom" read --room--; line 38-39, for "ni-nitro" read --dinitro--; page 2, first column, line 38, for "paras" read --parts--; lines 55 to 60 inclusive, for that portion of the formula reading
$$\begin{matrix} \text{OH} \\ \| \\ O=S=O \end{matrix} \quad \text{read} \quad \begin{matrix} \text{OH} \\ | \\ O=S=O \end{matrix}$$
; and that the said Letters Patent should be read with this correction therein, that the same may conform to the record of the case in the Patent Office.

Signed and sealed this 25th day of June, A. D. 1940.

(Seal)

Henry Van Arsdale,
Acting Commissioner of Patents.